Nov. 21, 1939.   A. P. REITZ   2,180,430

STEERING MECHANISM

Filed Dec. 27, 1937   3 Sheets-Sheet 1

Inventor
August P. Reitz.

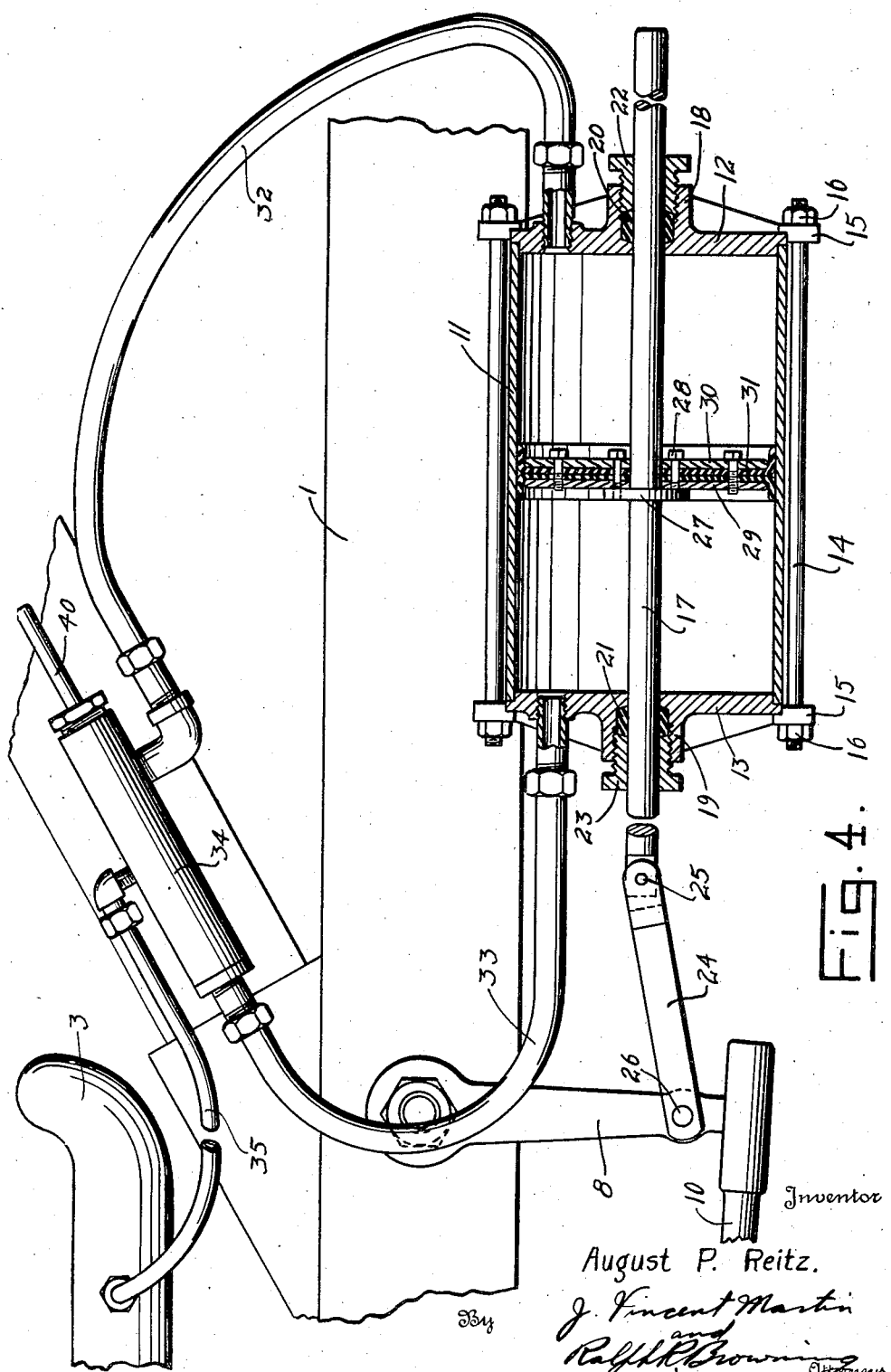

Nov. 21, 1939.  A. P. REITZ  2,180,430
STEERING MECHANISM
Filed Dec. 27, 1937  3 Sheets—Sheet 3
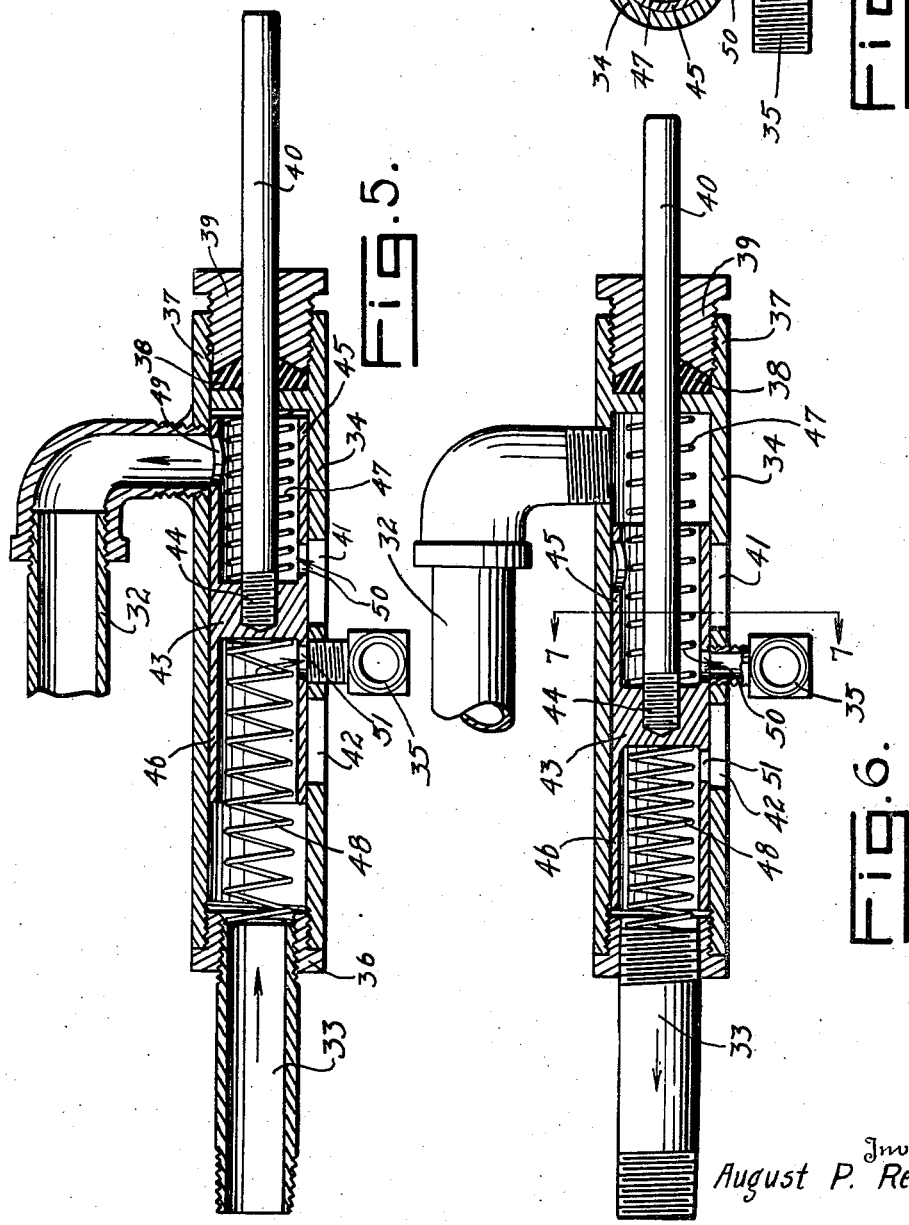
Inventor
August P. Reitz Patented Nov. 21, 1939

2,180,430

UNITED STATES PATENT OFFICE 2,180,430

STEERING MECHANISM

August P. Reitz, Houston, Tex., assignor, by mesne assignments, to Gary Gillis, Harris County, Tex.

Application December 27, 1937, Serial No. 181,840

3 Claims. (Cl. 180—79.2)

This invention relates in general to steering mechanisms for vehicles, and more particularly has reference to an auxiliary means for applying power to assist in the steering of vehicles under difficult circumstances.

In the ordinary vehicle steering system, power for swiveling the front or steering wheels of the vehicle is supplied wholly by the operator of the vehicle, although in most instances it is transmitted through mechanical connections which give the operator a great mechanical advantage in swiveling the steering wheels.

In the case of heavy trucks, however, and in some instances in the case of lighter vehicles where the load being carried is extremely heavy, or where the nature of the terrain is such that the wheels will bog down and make the front wheels extremely hard to swivel, it has been found that the operator is under many circumstances unable to apply sufficient power to the usual steering mechanism to swivel the wheels.

It is an object of this invention to provide a means whereby an operator of a vehicle may be enabled to take advantage of an outside source of power to assist him in swiveling the steering wheels.

Another object of this invention is to provide a means for utilizing the vacuum produced by an internal combustion engine as a source of power for turning or swiveling the steering wheels of a vehicle.

Another object of this invention is to provide a power means for assisting in the steering of vehicles, and to provide a means for controlling the application of such power in accordance with the natural movements of an operator in steering a vehicle.

Other objects and advantages of this invention will become apparent from the following description taken in connection with the accompanying drawings, wherein is set forth by way of illustration and example one embodiment of this invention.

In the drawings:

Fig. 4 is an enlarged view illustrating the various fluid connections between the respective parts of the apparatus, showing the power cylinder in vertical cross section.

Fig. 5 is a vertical cross sectional view showing the valve mechanism for controlling the movement of the piston in the power cylinder, with the valve in position for actuation of the power piston in one direction.

Fig. 6 is a view similar to Fig. 5 showing the valve in position for actuation of the power piston in the opposite direction.

Fig. 7 is a vertical cross sectional view taken along the line 7—7 of Fig. 6.

Figure 1:
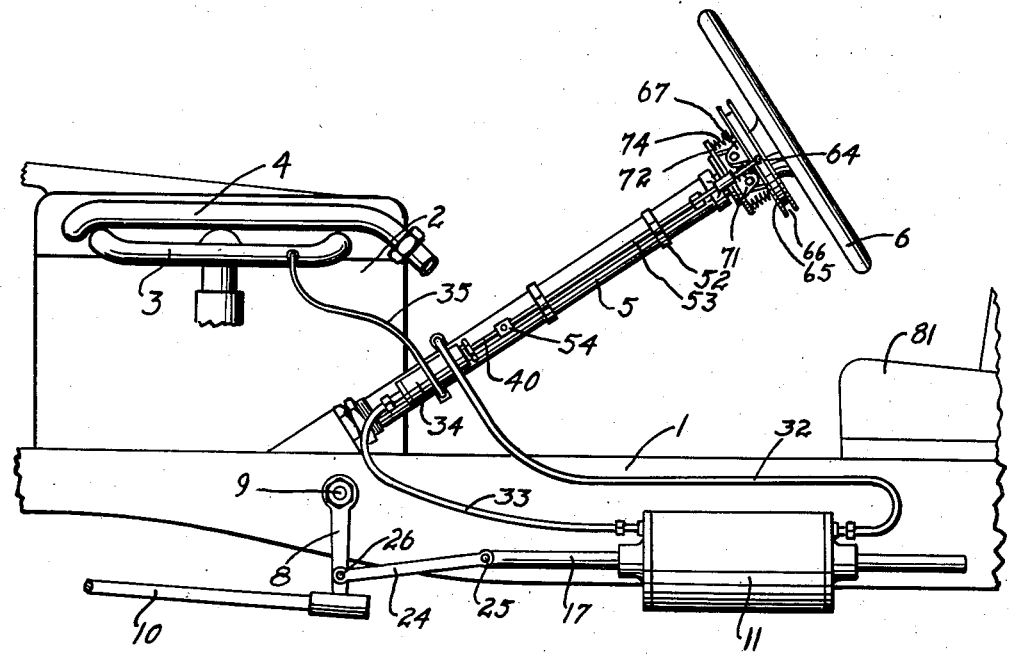
Fig. 1 is a side elevation of a portion of a vehicle chassis showing one embodiment of this invention as applied thereto.

Referring first to Fig. 1, the numeral 1 designates the side member of the frame of the vehicle, and the numeral 2 the internal combustion engine such as is customarily employed for propelling vehicles. This internal combustion engine is in the present instance provided with an intake manifold 3 and an exhaust manifold 4. The numeral 5 designates the customary steering column having a steering wheel 6 at the upper end thereof, and having the steering shaft 7 therewithin connected through a customary worm drive to a steering arm 8 adapted to swing in a vertical plane about its axis 9. To the lower end of this steering arm 8 is connected the steering drag link 10.

It will be appreciated that the vehicle is customarily steered by rotating the steering wheel 6 in the desired direction, thus causing the steering shaft 7 to be rotated and to act through the customary worm drive to swing the steering arm 8 about its axis 9. This in turn moves the drag link 10 in one direction or the other to cause the swiveling of the front wheels in the well known manner.

In the present instance for the purpose of assisting in steering the vehicle, there is rigidly mounted upon the side frame member 1 at a position spaced somewhat from the steering arm 8 a power cylinder 11 having heads 12 and 13, respectively, held against the ends of the cylinder by means of tie rods 14. These rods 14 pass through lugs or ears 15 on the respective heads, and the heads are tightened against the ends of the cylinder 11 by means of nuts 16 or the like. Extending through the cylinder 11 from one end to the other is a piston rod 17, this piston rod passing out through stuffing boxes 18 and 19, respectively, on the heads 12 and 13, and leakage about the piston rod 17 being prevented by means of packings 20 and 21 tightened into place by gland nuts 22 and 23. One end of this piston rod is connected by means of a connecting rod or link 24 to the steering arm 8, the connecting link 24 being pivoted at 25 to the piston rod 17, and at 26 to the steering arm 8 adjacent its lower end.

Intermediate the ends of the cylinder the piston rod 17 is provided with a laterally extending flange 27 to which is secured by means of cap screws 28 or the like a piston consisting of rigid plates 29 and 30 between which are clamped the central portions of oppositely directed sealing cups 31.

Communicating with the opposite ends of cylinder 11 through threaded openings in the heads 12 and 13, respectively, are the conduits 32 and 33 which lead to the side and end, respectively, of a valve housing 34 which may be mounted on the lower portion of the steering column 5. The central portion of this valve housing 34 is connected by a conduit 35 to the intake manifold 3 previously referred to.

Referring now to Figs. 5 and 6, it will be seen that the valve housing 34 consists of a substantially cylindrical member having a plug 36 at one end thereof into which the conduit 33 is threaded, and having a lateral connection adjacent its other end for the conduit 32. The end opposite the plug 36 is provided with a stuffing box 37 having therein a packing 38 compressed by means of a gland 39 so as to seal about the valve operating rod 40. Midway of its ends the valve housing 34 is provided with a threaded opening adapted for the connection of the conduit 35, and on opposite sides of this opening there are provided openings 41 and 42 to the atmosphere.

Within the valve housing is a piston valve element 43 secured to the end of the valve rod 40 by a threaded connection 44 or any other suitable means. This piston valve 43 has sleeve-like extensions 45 and 46, respectively, on its opposite ends, and springs 47 and 48 interposed between the opposite ends of the piston valve 43 and the ends of the valve housing 34 tending to urge the valve toward a position intermediate its path of travel. The sleeve-like portion 45 is provided with a lateral opening 49 in such position that when the valve is moved to the extreme right as shown in Fig. 5 this opening 49 will register with the opening communicating with the conduit 32. This same sleeve-like portion 45 has a second lateral opening 50 in such position that when the opening 49 registers with the entrance to the conduit 32 or when the pressure valve 43 is in its intermediate position, this opening 50 will register with the lateral opening 41 in the valve housing, but when the pressure valve 43 is in its opposite extreme position, this opening 50 will register with the entrance to the conduit 35 as shown in Fig. 6.

The other sleeve-like extension 46 is provided with a lateral opening 51 similar to the opening 50 in all respects and adapted when the valve is in one extreme or in intermediate position as shown in Fig. 6, to communicate with the opening 42 through the valve housing, but when the valve is in the other extreme position as shown in Fig. 5, to communicate with the opening into the conduit 35.

It will be seen from the foregoing that when the pressure valve 43 is in the position shown in Fig. 5, the vacuum produced in the intake manifold 3 will be exerted through the conduit 35, through the opening 51, through the conduit 33, and the pressure within the space to the left of the piston in the cylinder 11 will be lowered. At the same time, atmospheric pressure will be permitted to be exerted and the atmosphere will be permitted to enter the space within the right hand end of the cylinder 11 through the conduit 32, the opening 49, the opening 50, and the opening 41. The net result due to the differential pressure on the piston within the cylinder 11 will be to move this piston to the left as it is seen in Fig. 4, thereby forcing the steering arm 8 to pivot in a clock-wise direction about its axis and swivel the steering wheels in one direction.

If on the other hand the valve is in the position shown in Fig. 6, the vacuum existing within the intake manifold 3 will be communicated through the conduit 35, the opening 50, and the conduit 32 to the right hand end of the cylinder 11, and the air within this portion of the cylinder will be exhausted, thus lowering the pressure on the right of the piston within the cylinder. At the same time, air will be permitted to enter through the openings 42 and 51, and through the conduit 33 into the left hand end of the cylinder, thus moving the cylinder to the right as seen in Fig. 4, and through the various connections causing the arm 8 to pivot in a counter-clockwise direction and shifting the steering wheels of the vehicle in the opposite direction.

When the pressure valve 43 is in its intermediate position, both the opening 50 and the opening 51 will register with the respective openings 41 and 42 in the valve housing, and both the conduits 32 and 33 will be placed in communication with the atmosphere. It will thus be seen that atmospheric pressure will exist in both ends of the cylinder 11, and both sides of the piston at such times as the pressure valve 43 is in its intermediate position. The piston and its connecting link of course may thus be moved in either direction freely so that the vehicle may be steered manually without interference from the auxiliary steering means when the valve is in its intermediate position.

Figures 2, 3:
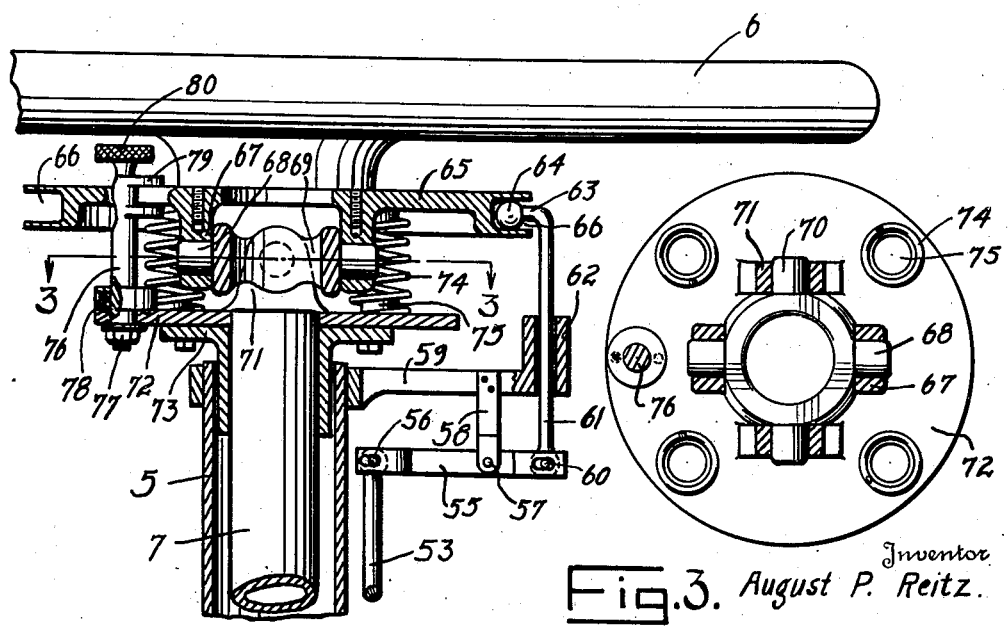
Fig. 2 is an enlarged view partly in vertical cross section illustrating certain details of construction of the controlling means for controlling the application of power to the auxiliary steering mechanism.
Fig. 3 is a cross sectional view taken along the line 3—3 of Fig. 2.

Referring now to the valve actuating means as illustrated in Figs. 1 to 3, inclusive, it will be seen that the steering column 5 is provided at intervals with guide brackets 52 adapted to receive a rod 53 which is coupled to the rod 40 by a suitable coupling device 54. This rod 53 is connected at its upper end to a lever 55 by means of a suitable lost motion connection 56. This lever 55 is pivotally mounted intermediate its ends at 57 on a bracket 58 which is in turn mounted on a bracket 59 mounted on the steering column adjacent its upper end. At its end opposite the pivot 56 the lever 55 is pivotally connected at 60 to a second rod 61, this rod 61 being slidably mounted in the slide portion 62 of the bracket 59. At its upper end, the rod 61 is bent inwardly at 63 and on its extreme end is mounted a ball 64.

The steering wheel 6 instead of being mounted directly on the steering shaft 7 is mounted on a disc-like member 65 having about its outer edge a channel 66 similar in formation to the channel of a sheave or pulley. This channel 66 is adapted to receive the ball 64 and upon tilting motion of the steering wheel 6 and the disc 65 to cooperate with the ball 64 to move the rod 61 upwardly or downwardly.

The disc 65 is provided with oppositely disposed downwardly extending lugs 67 having openings therein to receive the bearing pintles 68 of the universal joint member 69. The other bearing pintles 70 of this universal joint member are engaged with the lugs 71 formed on the disc 72. This disc 72 is rigidly secured to the flange 73 which is in turn mounted upon the steering shaft 7. Thus, any turning motion of the wheel 6 will be transmitted through the universal joint just described to the steering shaft 7, but the wheel will be permitted to freely tilt due to the presence of the universal joint.

Interposed between the discs 65 and 72 at four equally spaced points are identical springs 74 adapted to normally hold the wheel 6 in such position that the discs 65 and 72 will be substantially parallel to each other. For the purpose of maintaining these springs in their proper position they are engaged with lugs 75 formed on the respective discs.

Rotatably mounted on the disc 72 is a latching bolt 76 secured to the disc 72 by means of a nut 77 or the like, and having a spring-pressed ball 78 in engagement with the disc 72 to maintain it in any position of adjustment. This bolt 76 has latching lugs 79 thereon in position to engage the disc 65 when it is properly turned so as to prevent the disc 65 from tilting with respect to the disc 72. The bolt 76 may be rotated by means of a knurled head 80 or any similar arrangement.

The point of connection between the ball 64 and the disc 65 is at one side of the steering column as distinguished from being in front of or behind the steering column. The natural tendency of a person seated on a seat positioned in the usual manner with respect to a steering wheel as shown at 81 and endeavoring to rotate the steering wheel against considerable resistance is to push down on the side toward which he is endeavoring to cause the rotation. The operation of the device is, therefore, as follows:

Let it be assumed that the view shown in Fig. 2 is a view looking down upon the steering mechanism shown in Fig. 1. The operator seated upon the seat 81 desires to make a turn to the left and in endeavoring to make the turn encounters considerable resistance. The natural reaction is for him to put some axial stress on the steering wheel tending to tilt it so that the part beneath his left hand moves downwardly toward the steering column. This would move the rod 61 downwardly as it appears in Fig. 2, and would move the rod 53 and the connecting valve rod 40 upwardly. This would move the rod 40 as it appears in Fig. 5 in a right hand direction to the position shown in Fig. 5. When in this position, the conduit 33 would be connected to the conduit 35 which is in turn connected to the intake manifold. The pressure within the left hand portion of the cylinder 11 would then be partially exhausted. On the other hand, the port 50 would be connected with the opening 41, and air would be permitted to enter through these ports and pass through the conduit 32 into the right hand end of cylinder 11. The piston within the cylinder 11 would then be moved to the left moving the steering arm forwardly as shown in Figs. 1 and 4, and assisting the operator in his endeavor to swivel the front wheels so that the vehicle would make a left turn.

If on the other hand, a right turn is desired, the opposite reaction would cause the rod 61 to move upwardly, and the rods 53 and 40 to move downwardly, which would place the valve in the position shown in Fig. 6. In this position, the vacuum from the intake manifold would be connected through the port 50 and the conduit 32 to the right end of the cylinder 11, exhausting the pressure from this end of the cylinder. At the same time the port 51 would register with the opening 42 and permit air to pass inwardly through these openings through the conduit 33, and into the left end of the cylinder 11. This naturally would move the piston within this cylinder to the right, moving the steering arm 8 to the rear, and assisting the action of the operator in endeavoring mechanically to shift this arm to the rear and turn the vehicle to the right.

When no pressure is exerted upon the steering wheel to tilt it in either direction, the valve 43 will be maintained in its intermediate position both by the springs 47 and 48 and by the springs 74, and in this position both conduits 32 and 33 will be connected to the atmosphere through the ports 50 and 51, and the openings 41 and 42. The operator can then steer the vehicle in either direction mechanically without interference from the auxiliary power steering device.

If it be desired at any time to lock the power steering mechanism out of operation, it is only necessary to actuate the bolt 76 by means of its knurled head 80 to such a position that the lugs 79 engage the disc 65 and prevent it from tilting. With the disc 65 prevented from tilting the rods 61 and 53 and the valve 43 will be held in their intermediate position in which, as just explained, the power mechanism will not operate and will not interfere with the mechanical actuation of the steering device.

From the foregoing, it will be seen that a means has been provided for carrying out all the objects and advantages sought by this invention.

Having described my invention, I claim:

1. In a steering mechanism for a vehicle having an internal combustion engine, a steering linkage including a steering shaft rotatable to manually operate said linkage, a vacuum operated reciprocating motor connected to said linkage for assisting in said operation, a steering wheel, a universal joint connecting said steering wheel to said steering shaft to manually rotate the same while permitting tilting movement of said wheel, a radial flange on said shaft, resilient means interposed between said flange and said wheel at circumferentially spaced points to resiliently resist tilting movement of said wheel, an annular track on said wheel, a slide cooperating with said track adjacent one side of said wheel, a valve for controlling said motor operatively connected to said slide, said valve when said wheel is tilted in one direction connecting one side of said motor to the intake manifold of said engine and venting the opposite side to the atmosphere to actuate said motor in one direction, and when said wheel is tilted in the other direction connecting the other side of said motor to the intake manifold of said engine and venting the one side to the atmosphere to actuate said motor in the opposite direction, and when said wheel is not tilted to vent both sides of said motor to the atmosphere to permit free movement of said motor in either direction, and means for latching said wheel against tilting movement.

2. In combination, in a means for manually actuating a steering linkage and controlling a power booster therefor, an operator's post, a steering member connected to said post by a universal joint and rotatably and tiltably movable with respect to said post, means for transmitting rotary movement of said steering member by an operator to the steering linkage to manually operate the same, and a booster controller connected to said steering member to be actuated thereby upon tilting movement thereof by an operator, said tilting movement being always in a constant direction with respect to the operator's position to cause said power booster to assist in the operation of said steering linkage.

3. In combination, in a means for manually actuating a steering linkage and controlling a power booster therefor, an operator's post, a steering member connected to said post by a universal joint and rotatably and tiltably movable with respect to said post, means for transmitting rotary movement of said steering member by an operator to the steering linkage to manually operate the same, and a booster controller connected to said steering member to be actuated thereby upon tilting movement thereof by an operator, said tilting movement being always in a constant direction with respect to the operator's position to cause said power booster to assist in the operation of said steering linkage, and means to resiliently resist tilting movement of said steering member during rotary movement thereof.

AUGUST P. REITZ.